United States Patent Office 3,655,896
Patented Apr. 11, 1972

3,655,896
PHARMACEUTICAL COMPOSITIONS CONTAINING A SYMPATHOMIMETIC AMINE AND A TRIAZOLO-PYRIMIDINE DERIVATIVE AND METHODS OF PREVENTING BRONCHOSPASMS
George Edward Davies, Michael Dukes, and Thomas Paterson Johnston, Macclesfield, England, assignors to Imperial Chemical Industries Limited, London, England
No Drawing. Filed Aug. 22, 1969, Ser. No. 852,506
Claims priority, application Great Britain, Feb. 28, 1969, 10,901/69
Int. Cl. A61k 27/00
U.S. Cl. 424—251                             7 Claims

ABSTRACT OF THE DISCLOSURE

A method of preventing bronchospasm by administering in conjunction a sympathomimetic amine and a 2-amino (or substituted amino)-4-alkyl-5-oxo-6-alkyl-4,5-dihydro-s-triazolo[1,5-a]pyrimidine derivative, and also pharmaceutical compositions containing the above two components. The triazolo-pyrimidine derivatives were not previously known to possess bronchospasm inhibiting properties, and in addition the combined effect of both components is much greater than the sum of the individual effects.

---

This invention relates to the treatment of bronchospasm, and in particular it relates to pharmaceutical compositions which are capable of preventing bronchospasm and are therefore useful in the treatment of diseases which involve spasm or constriction of the bronchial musculature, for example asthma or bronchitis.

It is known that sympathomimetic amines, for example isoprenaline or adrenaline, are capable of preventing bronchospasm when administered to a host. It has now been found that certain s-triazolo[1,5-a]pyrimidine derivatives are capable of preventing bronchospasm and further, that these derivatives potentiate the action of sympathomimetic amines so that the combined effect of a sympathomimetic amine and an s-triazolo[1,5-a]pyrimidine, as hereinafter defined, in preventing bronchospasm is much greater than the sum of the effects of the individual components.

Derivatives of s-triazolo[1,5-a]pyrimidine have the following ring structure:

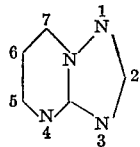

and are numbered as shown.

According to the invention there is provided a method of preventing bronchospasm in man and animals which comprises administering to the man or animal a sympathomimetic amine in conjunction with an s-triazolo[1,5-a]pyrimidine derivative of the formula:

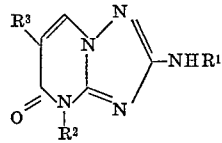

wherein $R^1$ stands for hydrogen or an alkyl radical of 1–4 carbon atoms, or an acyl radical of the formula $R^4.CO$—, wherein $R^4$ stands for an alkyl or alkoxy radical of 1–4 carbon atoms or a chlorophenyl radical, $R^2$ stands for an alkyl radical of 1–4 carbon atoms or an allyl or cyclopentyl radical, and $R^3$ stands for an alkyl radical of 1–4 carbon atoms.

A particularly suitable value for $R^1$, $R^2$ or $R^3$ when it stands for an alkyl radical is, for example, a methyl, n-propyl, isopropyl, n-butyl or s-butyl radical, and a particularly suitable value for $R^4$ when it stands for an alkyl or alkoxy radical is, for example, a methyl or ethoxy radical.

Specific examples of s-triazolo[1,5-a]pyrimidine derivatives which are particularly useful in the invention are the following derivatives of 5-oxo-4,5-dihydro-s-triazolo[1,5-a]pyrimidine:

2-amino-6-methyl-4-n-propyl-
2-acetamido-6-methyl-4-n-propyl-
2-ethoxycarbonylamino-6-methyl-4-n-propyl-
2-p-chlorobenzamido-6-methyl-4-n-propyl-
2-n-propylamino-6-methyl-4-n-propyl-
2-isopropylamino-6-methyl-4-n-propyl-
2-amino-6-methyl-4-n-butyl-
2-amino-6-methyl-4-s-butyl-
2-amino-6-methyl-4-allyl-
2-amino-6-methyl-4-cyclopentyl- and
2-amino-4,6-di-n-propyl-.

Of these, the compound 2-amino-6-methyl-5-oxo-4-n-propyl-4,5-dihydro-s-triazolo[1,5-a]pyrimidine is preferred.

Depending upon the biological properties of the sympathomimetic amine, the s-triazolo[1,5-a]pyrimidine may be administered together with the sympathomimetic amine in the form of a pharmaceutical composition containing both components or it may be administered separately from the sympathomimetic amine. Thus when the sympathomimetic amine is only effective when administered by inhalation, for example adrenaline or isoprenaline, the s-triazolo[1,5-a]pyrimidine may be administered by the use of an aerosol containing both components, or alternatively by oral administration at approximately the same time as the sympathomimetic amine is administered by inhalation. When the sympathomimetic amine is effective by oral or parenteral administration, a preferred method of administration is by the use of a pharmaceutical composition comprising both components, for example a tablet, capsule, solution or suspension, although separate administration is possible.

The exact proportion of sympathomimetic amine to s-triazolo[1,5-a]pyrimidine to be administered in order to produce the best result will depend upon the individual patient and the components used. However, in general, the amount of sympathomimetic amine administered should be from 2.5% to 25% by weight of the amount of s-triazolo[1,5-a]pyrimidine administered, and the total amount of material administered should be from 0.05 mg./kg. to 1.0 mg./kg. as and when required by the patient.

According to a further feature of the invention, there is provided a pharmaceutical composition comprising a sympathomimetic amine together with an s-triazolo[1,5-a]pyrimidine as defined above, and a pharmaceutically-acceptable diluent or carrier.

The pharmaceutical composition may be in a form suitable for administration by inhalation, for example an aerosol or preparation designed to produce an aerosol when desired, or in a form suitable for oral administration, for example a tablet, capsule, solution or suspension, or it may be in a form suitable for parenteral administration, for example a sterile, injectable solution or suspension. The composition may be manufactured by employing conventional techniques and by using conventional excipients. A dosage form, tablet, capsule or specified volume of a liquid formulation should contain a total of from 1 mg. to 20 mg. of sympathomimetic amine and s-triazolo[1,5-a]pyrimidine, and of this total, the sympathomimetic amine should form from 2.5% to 25% by weight.

A particularly suitable sympathomimetic amine which may be used in a pharmaceutical composition of the invention is one which shows bronchodilator activity when administered orally or parenterally, and a preferred compound because of its potent action upon bronchial muscle and relatively weak action upon cardiac muscle, is a 2-amino-1-phenylethanol derivative of the formula:

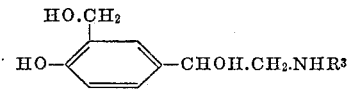

wherein $R^3$ stands for a branched-chain alkyl radical of up to 6 carbon atoms optionally substituted by a phenyl, phenoxy, hydroxyphenyl, methoxyphenyl or morpholino radical, or a pharmaceutically-acceptable acid-addition salt thereof. Of these 2-amino - 1 - phenylethanol derivatives, a particularly preferred compound is that wherein $R^3$ stands for the t-butyl radical.

When such a 2-amino - 1 - phenylethanol derivative is used in a pharmaceutical composition of the invention, it should form from 2.5% to 25% by weight of the s-triazolo[1,5-a]pyrimidine, and a dosage form for the treatment of asthma should contain a total of from 1 mg. to 20 mg. of the active ingredients.

Other suitable sympathomimetic amines which may be used in a pharmaceutical composition of the invention are compounds of the formula:

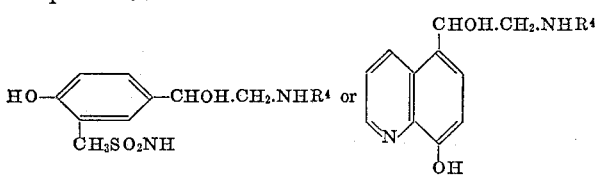

wherein $R^4$ stands for a branched-chain alkyl radical of up to 6 carbon atoms, for example an isopropyl or t-butyl radical. These compounds may be used in the compositions of the invention in the same way as the 2-amino-1-phenylethanol derivatives described above.

The s-triazolo[1,5-a]pyrimidine derivatives used in the invention may be obtained by the condensation of a triazole derivative of the formula:

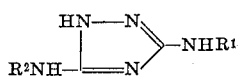

wherein $R^1$ and $R^2$ have the meanings stated above, with an unsaturated ester of the formula:

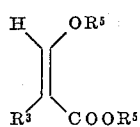

wherein $R^3$ has the meaning stated above, and $R^5$ stands for an alkyl radical of 1–4 carbon atoms, under basic conditions.

Such basic conditions may be obtained by carrying out the condensation in the presence of a base, for example a sodium alkoxide, for example sodium ethoxide. The condensation is conveniently carried out in the presence of a diluent or solvent, for example ethanol, and it may be accelerated or completed by heating, for example, to a temperature from 50° C. to 150° C.

It should be noted that if, in the triazole derivative employed in the above condensations, $R^1$ stands for a hydrogen atom or an alkyl radical which is different from $R^2$, then the condensations will lead to a mixture of two products in which the values of $R^1$ and $R^2$ are reversed, and separation of such a mixture is necessary. In these circumstances, an alternative method of preparation is by the condensation of guanazole, that is 3,5-diamino - (1,2,4)triazole with the above unsaturated ester under basic conditions to give a triazolo-pyrimidine derivative of the formula:

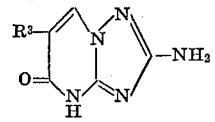

followed by alkylation of the product to give a triazolo-pyrimidine derivative of Formula I wherein $R^1$ stands for hydrogen, followed by further alkylation or acylation of this product as desired.

Further details of the preparation of s-triazolo[1,5-a]pyrimidine derivatives which may be used in this invention are given in our co-pending U.K. application No. 43,627/68, filed Sept. 13, 1968 (U.S. Ser. No. 850,221). However, the following details of the preparation of 2-amino- (and 2-ethoxycarbonylamino-) 6-methyl-5-oxo-4-n-propyl - 4,5 - dihydro-s-triazolo[1,5-a]pyrimidine will serve as a model for the preparation of such compounds.

Guanazole (60 g.) was dissolved in ethanol (460 ml.) containing sodium ethoxide (41.25 g.) and methyl β-methoxy-α-methylacrylate (86.8 g.) was added. The mixture was stirred and heated under reflux for 2 days, then cooled to 40° C. and water (330 ml.) added. The pH was adjusted to 4 with concentrated hydrochloric acid (54.5 ml.) and the 2-amino-6-methyl-5-oxo-4,5-dihydro-s-triazolo[1,5-a]pyrimidine, M.P. 325° C. was collected by filtration and washed with water (150 ml.) and acetone (150 ml.).

A solution of this product (25 g.) in dry dimethylformamide (600 ml.) at 50° C. was added to sodium hydride (74 g., 50% oil dispersion previously washed with 40–60° C. petroeum ether by decantation) and the mixture stirred at 60° C. until clear. 1-bromopropane (30 ml.) was added over 2 hours, with stirring, the temperature being maintained at 60–70° C. After 16 hours, the solution was evaporated in vacuo and the residue stirred to a paste with water (5 ml.), filtered and sucked dry. The solid was then suspended in ether (40 ml.) and filtered. The solid was then dissolved in 35% ethanol in ethyl acetate (400 ml.) and stirred with neutral alumina (250 g.) and the suspension filtered. The alumina was washed with 50% ethanol in ethyl acetate (750 ml.) and the combined filtrate and washings evaporated in vacuo. The residue was crystallised from ethyl acetate and then ethanol to give 2-amino-6-methyl-5-oxo-4-n-propyl-4,5-dihydro-s-triazolo[1,5-a]pyrimidine, M.P. 164—165° C.

A solution of the above 2-amino derivative (2 g.) in pyridine (20 ml.) was treated dropwise with ethyl chloroformate (2 ml.) in benzene (5 ml.). After 30 minutes the mixture was evaporated in vacuo, and water (10 ml), 2 N hydrochloric acid (10 ml.) and chloroform (100 ml.) added to the residue. The chloroform layer was separated, washed with water and dried and evaporated in vacuo. The resulting solid was crystallized from ethyl acetate to give 2-ethoxycarbonylamino-6-methyl-5-oxo-4-n-propyl-4,5-dihydro-s-triazolo[1,5 - a]pyrimidine, M.P. 173° C.

The invention is illustrated but not limited by the following examples.

EXAMPLE 1

A mixture of 5.0 parts of 2-amino-6-methyl-5-oxo-4-n-propyl - 4,5 - dihydro - s - triazolo[1,5-a]pyrimidine, 0.25 part of 2-(t-butylamino) - 1 - [(4 - hydroxy - 3 - hydroxymethyl)phenyl]ethanol (optionally as its hydrochloride), 65 parts of maize starch, 130 parts of calcium phosphate and 1 part of magnesium stearate is compressed, and the compressed mixture is then broken down into granules by passage through a 16-mesh screen. The resultant granules are then compressed into tablets each containing a total of 5.25 mg. of the active ingredients.

EXAMPLE 2

A normal guinea-pig lung was removed from the animal and mounted in the apparatus described by Bhattacharya and Delaunois (Arch. int. pharmacodyn. 1965, 101, 495). The lung was perfused with Tyrode's solution containing 3% dextran at a rate of 2.0 ml. per minute, while at the same time being artifically respired by a pump delivering 9 ml. of air per stroke and running at 22 strokes per minute. Pressure changes in the air in the trachea were measured with a pressure transducer connected to a recording device, and so bronchospasm induced by the presence of acetylcholine in the perfused fluid could be measured. Test compounds were added to the Tyrode's solution being perfused through the lung, and acetylcholine was added at 4-minute intervals after the addition of the test compound. The degree of bronchospasm produced by the acetylcholine was measured and compared with the degree of bronchospasm produced by acetylcholine in the absence of a test compound. The percentage inhibition of acetylcholine-induced bronchospasm produced by the test compound at a given interval after administration of the test compound was then calculated. The mean vealue of this percentage inhibition determined in four separate lugs was then recorded.

The following results were obtained:

Treatment:  Percentage inhibition of acetylcholine-induced bronchospasm

A. 2 - (t - butylamino)-1-[(4-hydroxy-3-hydroxymethyl)phenyl]ethanol, 0.05 μg. Challenged with acetylcholine 2.5 μg. after:
- 4 minutes _____ 6.25±3.1
- 8 minutes _____ 0

B. 2-amino - 6 - methyl-5-oxo-4-n-propyl-4,5 - dihydro-s-triazolo[1,5 - a]pyrimidine 1.0 μg. Challenged with acetylcholine after:
- 4 minutes _____ 0

C. 2 - (t - butylamino)-1-[(4-hydroxy-3-hydroxymethyl)phenyl]ethanol, 0.05 μg. together with 2-amino-6-methyl-5-oxo-4 - n - pyropyl - 4,5 - dihydro-s-triazolo - [1,5 - a]pyrimidine 1.0 μg. Challenged with acetylcholine after:
- 4 minutes _____ 40.5±10.9
- 8 minutes _____ 15.5±4.6
- 12 minutes _____ 8.5±0.5

D. In a separate experiment, 2-(t-butylamino) - 1 - [(4 - hydroxy-3-hydroxymethyl)phenyl]ethanol, 0.2 μg. Challenged with acetylcholine after:
- 4 minutes _____ 10.3±6.0

E. 2-amino - 6 - methyl-5-oxo-4-n-propyl-4,5 - dihydro - s - triazolo[1,5 - a]pyrimidine, 5 μg. Challenged with acetylcholine after:
- 4 minutes _____ 15.2±4.3

From the above results it is clear that treatment with the combination of both drugs, C, produced a greater and more persistent effect than treatment with either component at the same dose, A and B, or at 4 and 5 times that dose respectively, D and E.

What is claimed is:

1. A pharmaceutical composition for preventing bronchospasm, in dosage form for administration orally, parenterally or by inhalation comprising a sympathomimetic amine together with an s-triazolo[1,5-a]pyrimidine of the formula:

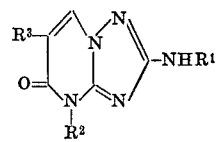

wherein $R^1$ is hydrogen, alkyl of 1–4 carbon atoms, or acyl of the formula $R^4.CO$—, wherein $R^4$ is alkyl or alkoxy of 1–4 carbon atoms or chlorophenyl; $R^2$ is alkyl of 1–4 carbon atoms, allyl or cyclopentyl; and $R^3$ is alkyl of 1–4 carbon atoms, and a major amount of a pharmaceutically-acceptable carrier, the amount of sympathomimetic amine in said composition being from 2.5% to 25% by weight of the amount of s-triazolo[1,5-a]pyrimidine and said composition containing a total of from 1 mg. to 20 mg. of said sympathomimetic amine and s-triazolo[1,5-a]pyrimidine taken together.

2. A composition according to claim 1 wherein $R^1$ is hydrogen or ethoxycarbonyl, $R^2$ is n-propyl and $R^3$ is methyl or n-propyl.

3. A composition according to claim 1, wherein the s-triazolo-[1,5-a]pyrimidine is 2-amino-6-methyl-5-oxo-4-n-propyl-4,5-dihydro-s-triazolo[1,5-a]pyrimidine.

4. A composition according to claim 1, wherein the sympathomimetic amine is adrenaline or isoprenaline.

5. A composition according to claim 1, wherein the sympathomimetic amine is a 2-amino-1-phenylethanol of the formula:

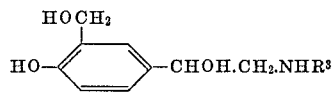

wherein $R^3$ is t-butyl.

6. A method of preventing bronchospasm in man and animals which comprises administering to said man or animal a sympathomimetic amine in conjunction with an s-triazolo[1,5-a]pyrimidine of the formula:

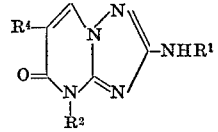

wherein $R^1$ is hydrogen, alkyl of 1–4 carbon atoms, or acyl of the formula $R^4.CO$—, wherein $R^4$ is alkyl or alkoxy of 1–4 carbon atoms or chlorophenyl; $R^2$ is alkyl of 1–4 carbon atoms, allyl or cyclopentyl; and $R^3$ is alkyl or 1–4 carbon atoms, the amount of said sympathomimetic amine administered being from 2.5% to 25% by weight of the amount of s-triazolo[1,5-a]pyrimidine administered, and the total amount of both components being from 0.05 mg./kg. to 1.0 mg./kg.

7. The method of claim 6 wherein the s-triazolo-[1,5-a]pyrimidine is 2-amino-6-methyl-5-oxo-4-n-propyl-4,5-dihydro-s-triazolo[1,5-a]pyrimidine.

References Cited

UNITED STATES PATENTS

| | | | |
|---|---|---|---|
| 3,202,512 | 8/1965 | Williams | 260—256.4 F |
| 3,271,401 | 9/1966 | Williams | 260—256.4 F |

STANLEY J. FRIEDMAN, Primary Examiner

U.S. Cl. X.R.

260—256.4; 424—330